United States Patent
Kawata et al.

(10) Patent No.: US 9,481,426 B2
(45) Date of Patent: Nov. 1, 2016

(54) SWING ARM

(71) Applicant: SUZUKI MOTOR CORPORATION, Hamamatsu-shi, Shizuoka (JP)

(72) Inventors: Koichiro Kawata, Hamamatsu (JP); Katsuhiro Naito, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/532,696

(22) Filed: Nov. 4, 2014

(65) Prior Publication Data

US 2015/0130161 A1 May 14, 2015

(30) Foreign Application Priority Data

Nov. 8, 2013 (JP) ................. 2013-231793
Jan. 24, 2014 (JP) ................. 2014-011375

(51) Int. Cl.
*B62K 25/28* (2006.01)
*B62K 11/02* (2006.01)
*B62K 25/20* (2006.01)

(52) U.S. Cl.
CPC .................. *B62K 25/283* (2013.01)

(58) Field of Classification Search
CPC ...................................... B62M 7/00
USPC ......... 180/227; 280/284, 288; D12/110, 111, D12/118, 122, 114
See application file for complete search history.

(56) References Cited

U.S. PATENT DOCUMENTS

| 4,733,881 | A | * | 3/1988 | Mueller | 280/291 |
| 4,887,687 | A | * | 12/1989 | Asai | B62K 19/04 |
| | | | | | 180/219 |
| D320,585 | S | * | 10/1991 | Brown | D12/111 |
| 6,481,523 | B1 | * | 11/2002 | Noro et al. | 180/227 |
| 6,789,638 | B2 | * | 9/2004 | Miyashiro | 180/227 |
| 8,955,633 | B2 | * | 2/2015 | Nakamura et al. | 180/227 |
| 2003/0006080 | A1 | * | 1/2003 | Buell et al. | 180/225 |
| 2008/0169149 | A1 | * | 7/2008 | Holroyd et al. | 180/227 |
| 2008/0196960 | A1 | * | 8/2008 | Brown et al. | 180/227 |

FOREIGN PATENT DOCUMENTS

| JP | 1-269687 | * 10/1989 |
| JP | 2-193791 | * 7/1990 |
| JP | 2012-76612 A | 4/2012 |

\* cited by examiner

*Primary Examiner* — Anne Marie Boehler
(74) *Attorney, Agent, or Firm* — Stein IP, LLC

(57) ABSTRACT

There is provided a swing arm for a motorcycle. A base section is connected to a chassis framework via a pivot member. A pair of rear-arm sections extend rearwards from the base section. A pair of bracket sections are respectively provided at rear end portions of the rear-arm sections to rotatably support a rear wheel. Each of the bracket sections is formed into a shape including a hole through which an axle of the rear wheel passes, an engaging plane formed at a region surrounding the hole, and a peripheral formation plane positioned to connect with the outer periphery of the rear-arm sections. An inner surface of the peripheral formation plane in the width direction is formed so as to be inclined outwards in the width direction from a side of formation region of the hole towards a front side as viewed from the top.

6 Claims, 6 Drawing Sheets

SWING ARM

The disclosure of Japanese Patent Application No. 2013-231793 filed on Nov. 8, 2013 and Japanese Patent Application No. 2014-011375 filed on Jan. 24, 2014, including specifications, drawings and claims is incorporated herein by reference in its entirety.

TECHNICAL FIELD

The invention relates to a swing arm for a motorcycle which supports a rear wheel so that the rear wheel can pivot in a vertical direction.

BACKGROUND

A swing arm for a motorcycle is configured so that the front end thereof is rotatably connected to a chassis framework via a rear suspension and the rear end thereof rotatably supports a rear wheel (see Japanese Patent Application Publication No. 2012-076612). The swing arm disclosed in Japanese Patent Application Publication No. 2012-076612 includes a base section which is connected to the chassis framework via a pivot shaft, and a pair of right and left arm sections which extend rearwards from the base section so that the rear wheel is disposed between the arm sections. The arm sections rotatably support the axle of the rear wheel at the rear ends thereof. The swing arm is configured to absorb a motion of the chassis framework in a vertical direction.

In the swing arm disclosed in Japanese Patent Application Publication No. 2012-076612, inner surfaces of portions of the respective arm sections including rear ends of the respective arm sections are formed in parallel with the center line of the motorcycle and inner corner parts bridging between the arm sections and the base section are formed into circular arc shapes as viewed from the top. In order to secure a clearance between the rear when and the respective arm sections, the dimension of the radius of the circular arc have to be small. Accordingly, the corner parts are likely to be subjected to a large stress concentration, thereby causing disadvantage in the rigidity. This problem becomes remarkable when the width of the respective arm sections in the with direction of the motorcycle is made thin in order to reduce the rigidity of the arm sections against an external load in the width direction.

By the way, the motorcycle equipped with such a swing arm is able to maintain a very deep banking angle upon turning, due to an improvement in technology such as in a field of tires. This is remarkable in racing or super-sports motorcycles.

As a suspension can absorb the motion of the chassis framework only in the vertical direction, in the motorcycle capable of maintaining the deep baking angle upon turning, there is a growing need for, in addition to an improvement in torsional rigidity for improving straight-motion stability or maneuverability, the optimization of lateral bending rigidity related to the absorbency or stability upon turning, by absorbing a lateral force applied from the irregular road to the chassis framework with the deformation of the chassis framework or the swing arm.

The swing arm for the motorcycle disclosed in Japanese Patent Application Publication No. 2012-076612, however, less considers the lateral bending rigidity, but merely employs a structure in which a front side base section of the swing arm is strengthened and arm sections holding an axle is connected thereto in order to efficiently realize improved torsion rigidity and weight saving.

In order to reduce the lateral bending rigidity in such a motorcycle which adopts such a structure, is it necessary to employ a structure in which the arm sections for holding the axle of the real wheel is made thin so as to be greatly deformed. In this case, however, the stress concentration occurs on the connection parts between the base section and the respective arm sections when a lateral force is applied to the swing arm. Because of this, the connection parts are required to be reinforced, causing a problem of increase in weight of the chassis framework. Another problem also arises in that, even with the reinforced connection parts, the lateral bending rigidity may not essentially be reduced to a desired value.

SUMMARY

It is therefore an object of the present invention to provide a swing arm capable of suppressing the stress concentration on a region extending from the base section connected to the chassis framework over the rear-arm sections positioned so that the rear wheel is disposed therebetween.

It is therefore another object of the present invention to provide a swing arm for a motorcycle, having an adequate rigidity balance with high torsion rigidity and low lateral bending rigidity without increase in weight of the motorcycle.

According to an aspect of the embodiments of the present invention, there is provided a swing arm pivotably connected to a chassis framework of a motorcycle to support a rear wheel, the swing arm including: a base section connected to the chassis framework via a pivot member; a pair of rear-arm sections extending rearwards from the base section so that the rear wheel is disposed between the rear-arm sections in the width direction of the motorcycle; and a pair of bracket sections provided at rear end portions of the rear-arm sections, respectively, to rotatably support the rear wheel, wherein each of the bracket sections is formed into a shape comprising a hole through which an axle of the rear wheel passes, an engaging plane formed at a region surrounding the hole and extending in a longitudinal direction of the motorcycle, and a peripheral formation plane positioned to connect with the outer periphery of the rear-arm section, wherein an inner surface of the peripheral formation plane in the width direction is formed so as to be inclined outwards in the width direction from a side of formation region of the hole towards a front side as viewed from the top.

With this configuration, since the inner surface of the peripheral formation plane in the width direction is formed in a direction inclined outwards in the width direction towards the front side as viewed from the top, the rear portions of the rear-arm sections adjacent to the bracket sections can also be easily designed to have the same inclination direction. In addition, the front end side of each of the rear-arm sections can be easily designed to be inclined inwards in the width direction towards the base section, so it is possible for the respective rear-arm sections to be formed easily into a shape swelled outwards in the width direction. Accordingly, when the inner corner parts bridging between the base section and the respective rear-arm sections are formed into a circular arc shape as viewed from the top, the dimension of the circular arc shape can be set larger than that of the conventional structure, while securing the clearance between the rear wheel and the respective rear-arm sections. Therefore, a cross-sectional shape extending from the rear-arm sections towards the base section can change smoothly, so that it is possible to suppress the stress concentration on the region extending over the rear-arm sections and the base section. Further, due to the suppression of the stress concentration, the width of the rear-arm sections in the width direction can be made thinner, so that the rigidity of the rear-arm sections against the external load in the width direction can be reduced.

In the swing arm, each of the rear-arm sections may extend in a direction swelled outwards as viewed from the top, an interval between the rear-arm sections as viewed from the top may be formed so as to be a maximum value at a substantially center portion between a rear portion of a crossing section and the engaging plane, and a region extending over the base section from an outer surface of a front side of each of the rear-arm sections in the width direction may be formed into a curved shape as viewed from the top. With this configuration, a portion having the curved shape in the inner region extending over the respective rear-arm sections and the base section may be formed to have a small curvature, thereby suppressing the stress concentration applied to the inner region.

In the swing arm, a region extending over a front side of the base section from the outer surface of the front side of each of the rear-arm sections may be formed into a curved shape which is recessed inwards in the width direction as viewed from the top. With this configuration, the stress concentration on the outer region extending over the respective rear-arm sections and the base section can be suppressed.

According to the swing arm described above, it is possible to suppress the stress concentration on a region extending over the base section connected to the chassis framework from the rear-arm sections which are positioned with a rear wheel disposed therebetween.

According to a second aspect of the embodiments of the present invention, there is provided a swing arm for a motorcycle, including: a pivot section connected to a chassis framework via a pivot shaft; a pair of right and left front-arm sections extending rearwards from the pivot section, a crossing section connecting rear portions of the right and left front-arm sections; a pair of right and left rear-arm sections extending rearwards from the crossing section so that a rear wheel is disposed therebetween; and a pair of bracket sections rotatably supporting the rear wheel at rear end portions of the right and left rear-arm sections, wherein an opening penetrating in a vertical direction is formed by the pivot section, the pair of right and left front-arm sections, and the crossing section, and a rear suspension is disposed within the opening, wherein the pair of right and left front-arm sections are respectively formed with recessed parts which are curved inwards in a width direction of the motorcycle and the recessed parts expand outwards in the width direction toward a rear side and are continuous to the right and left rear-arm sections through the crossing section.

With this configuration, the swing arm is deformed when the motorcycle banks upon turning, so that the lateral force applied from the irregular road to the chassis framework can be easily absorbed. This contributes to an improvement in absorbency or stability upon turning, in addition to an improvement in the torsional rigidity for improving the straight-motion stability or maneuverability.

In the swing arm, front side regions of the rear-arm sections are formed with holes through which a drive chain for transmitting power from an engine to the rear wheel is passable, and the recessed parts are formed at inner sides of inner surface of the drive chain in the width direction.

With this configuration, since a section along which the drive chain may be brought into contact with the outer surface of the swing arm is shortened, a mounting space for a chain buffer can be reduced, thereby saving the weight and the cost of the motorcycle.

In the swing arm, the pivot section, the front-arm sections, the crossing section, and the rear-arm sections are symmetrically arranged with respect to a center line of the motorcycle.

According to this configuration, the rigidity balance of the swing arm can be further improved, thereby further improving the maneuverability and stability.

According to the swing arm described above, various advantageous effects such as the provision of the swing arm for the motorcycle which maintains an adequate rigidity balance with high torsion rigidity and low lateral bending rigidity without an increase in weight of the motorcycle can be obtained.

DETAILED DESCRIPTION OF THE EMBODIMENTS

[First Embodiment]

Figure 1:
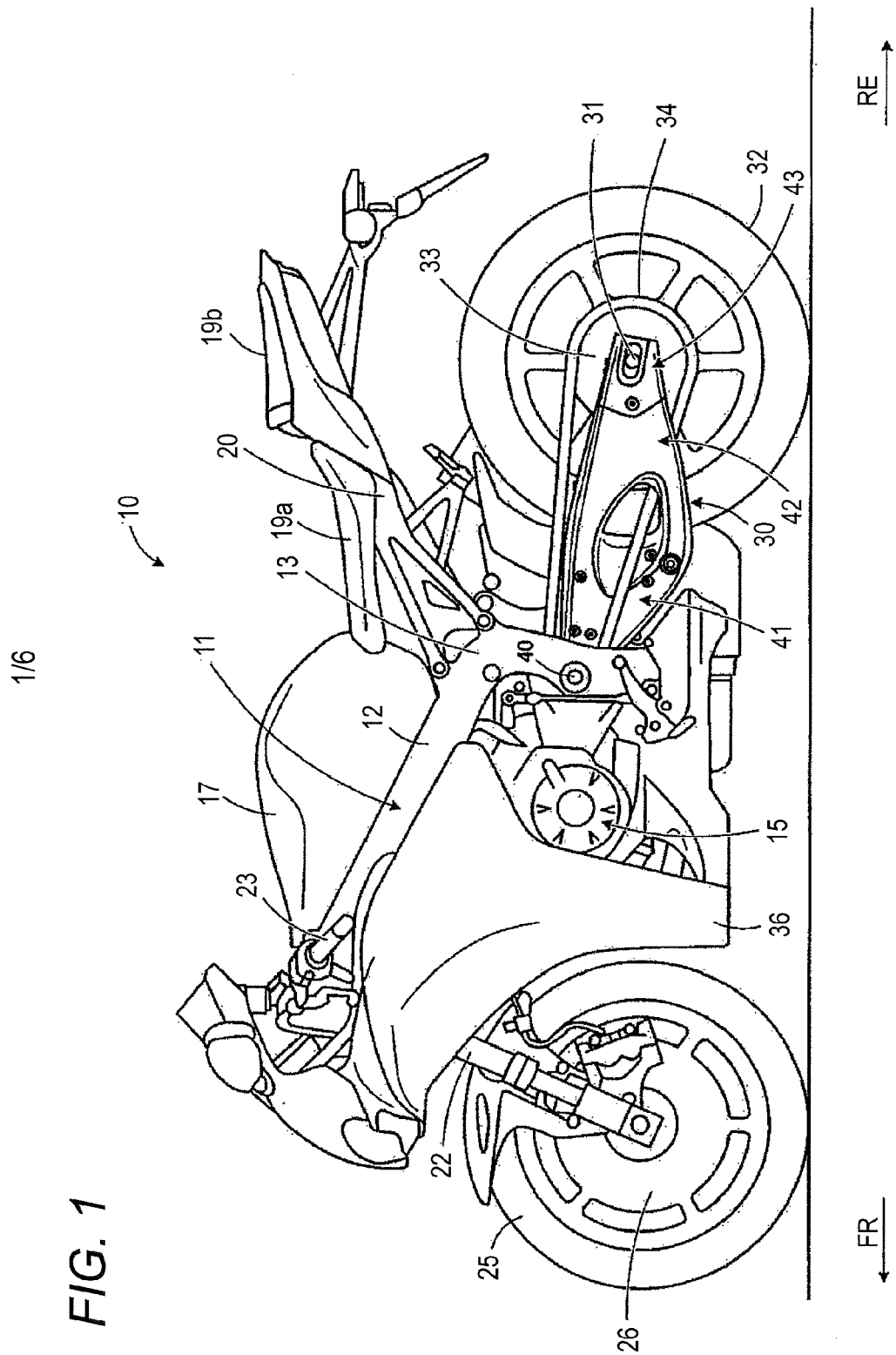
FIG. 1 is a left side view of a motorcycle according to a first embodiment of the present invention.

A first embodiment of the present invention will now be described in detail with reference to the accompanying drawings. Although an example of a swing arm to be adapted to an on-road type motorcycle will be described hereinbelow, the adaptive object is not limited thereto, but may change. For example, the swing arm may be adapted to other type motorcycles.
kokokara The schematic construction of a motorcycle according to the first embodiment will now be described with reference to FIG. 1. FIG. 1 is a left side view of the motorcycle according to the first embodiment. In the following description, as shown in FIG. 1, the forward direction (front side) is indicated by the arrow FR, the rearward direction (rear side) is indicated by the arrow RE, the left side is the near side perpendicular to the paper plane of FIG. 1, and the right side is the far side perpendicular to the paper plane of FIG. 1.

As shown in FIG. 1, the motorcycle 10 is provided with a chassis framework 11 made of steel or aluminum alloy to which discrete parts such as a power unit, electric components and the like are mounted. The chassis framework 11 has a main frame part 12 which is divided into right and left sections from a head pipe (not shown) positioned at a front side thereof, and extends obliquely downward towards the rear side thereof. A swing arm bracket 13 extends downwards from the rear end side of the main frame part 12.

Below the main frame part 12, an engine 15 is suspended from and mounted to an engine suspending bracket (not shown) and the swing arm bracket 13. The engine 15 is comprised of e.g. a parallel 4-cylinder engine and a transmission. A fuel tank 17 is disposed above the main frame part 12. A rider seat 19*a* and a pillion seat 19*b* are continuously mounted at the rear side of the fuel tank 17. The rider seat 19*a* and the pillion seat 19*b* are supported by a pair of right and left seat rails 20 connected to the rear part of the main frame part 12.

A front fork 22 is rotatably supported by the front end portion of the chassis framework 11 via a steering shaft (not shown). A handle bar (not shown) is provided on an upper end portion of the steering shaft, and grips 23 are respectively provided on both sides of the handle bar. A front wheel 25 is rotatably supported by the lower portion of the front fork 22. The front wheel 25 is provided with a brake disc 26.

A swing arm 30 is vertically-pivotably connected to the swing arm bracket 13 of the chassis framework 11, and a suspension (not shown) is connected between the chassis framework 11 and the swing arm 30. A rear wheel 32 is rotatably supported by the rear portion of the swing arm 30 through an axle 31 extending in the width direction of the motorcycle. A driven sprocket 33 is provided at the left side of the rear wheel 32 so that power from the engine 15 is transmitted to the rear wheel 32 via a drive chain 34. Further, a cowl 36 as an exterior cover of the motorcycle is provided on the chassis framework 11 and the like. A gap is formed between the cowl 36 and the chassis framework 11 to introduce external air from the front side of the motorcycle towards the engine 15.

Figure 2:
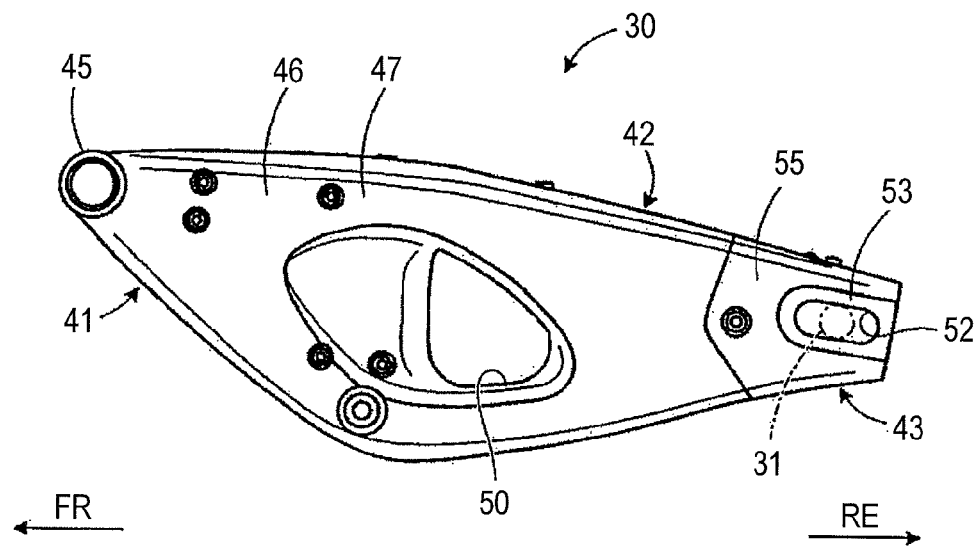
FIG. 2 is a left side view of a swing arm according to the first embodiment of the present invention.
Figure 3:
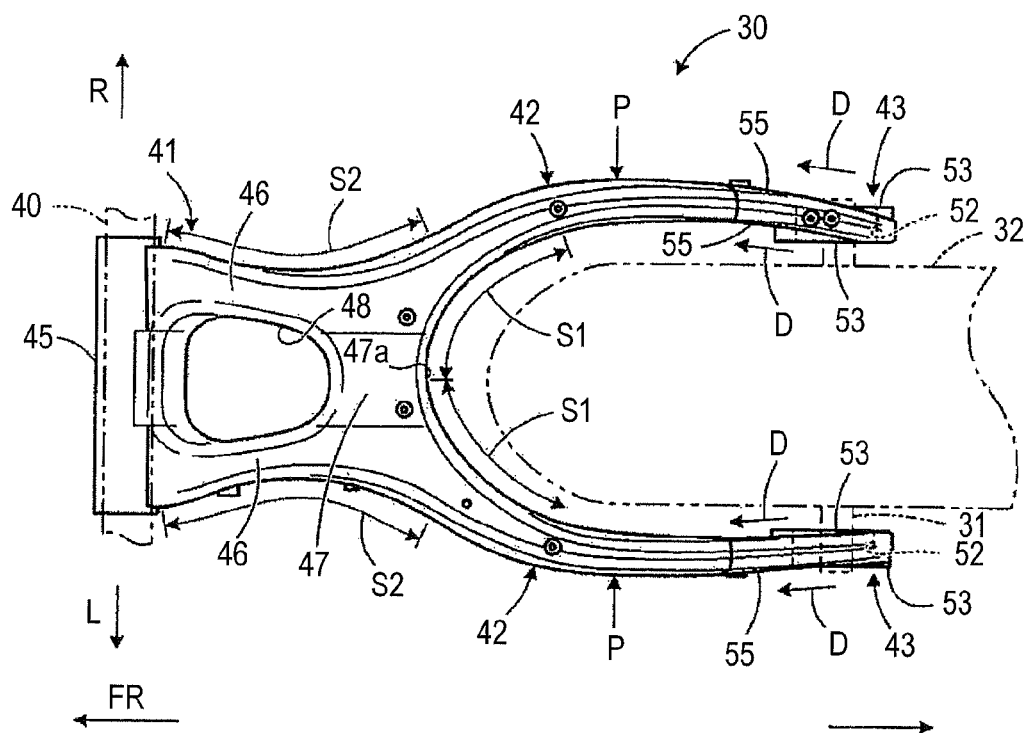
FIG. 3 is a top view of the swing arm according to the first embodiment of the present invention.

The swing arm 30 will be described with reference to FIGS. 2 and 3. FIG. 2 is a left side view of the swing arm according to the first embodiment, and FIG. 3 is a top view of the swing arm according to the first embodiment. In FIGS. 2 and 3, arrows FR, RE, L, and R respectively denote the forward direction (front side), the rearward direction (rear side), the left side, and the right side of the motorcycle.

As shown in FIGS. 2 and 3, the swing arm 30 includes a base section 41 which is connected to the swing arm bracket 13 (see FIG. 1) via a pivot shaft 40 as a pivot member, a pair of right and left rear-arm sections 42 which extend rearwards from the base section 41, and a pair of right and left bracket sections 43 which are provided on the rear end portions of the respective rear-arm sections 42. In the first embodiment, the base section 41 and the rear-arm sections 42 are formed into a hollow-molded body by press-molding. The bracket sections 43 are integrally faulted by forging or casting.

The base section 41 comprises a cylindrical pivot part 45 which extends in the width direction of the motorcycle, and the pivot shaft penetrates into the pivot part 45. A pair of right and left front-arm sections 46 extends rearwards are provided so as to be continuous to the rear side of the pivot part 45, and a single crossing section 47 is provided so as to continuous to the rear side of the respective front-arm sections 46. Accordingly, an opening 48 which is vertically-opened as viewed from the top, is formed at a position surrounded by the pivot part 45, the front-arm sections 46, and the crossing section 47, and the base section 41 is formed into a substantially rectangular frame-shape as viewed from the top.

The rear-arm sections 42 extend rearwards from the crossing section 47 so that the rear wheel 32 can be disposed between the rear-arm sections 42. Further, a front side region at a side surface of the respective rear-arm sections 42 is provided with an opening 50 having substantially-triangular shape, through which a drive chain 34 (see FIG. 1) passes.

The bracket sections 43 are respectively connected to the rear end portions of the rear-arm sections 42 by welding. The respective bracket section 43 are formed, at the rear end side thereof, with a hole 52 through which an axle 31 passes. The rear wheel 32 can be rotatably supported by the respective bracket sections 43 when the axle 31 is inserted into the hole 52 and a hub (not shown) of the rear wheel 32. The hole 52 is a long hole which elongated in the longitudinal direction rather than the vertical direction, so that the longitudinal position of the rear wheel 32 can be adjusted by longitudinally moving the axle 31 in the hole.

On both right and left surfaces of the respective bracket sections 43, an engaging plane 53 is formed at a region surrounding the hole 52. The engaging plane 53 is oriented parallel with a plane extending in the vertical direction and the longitudinal direction, and comes into surface-contact with components or the like to be attached to the periphery of the axle 31. Further, the respective bracket sections 43 are provided with a peripheral formation plane 55 positioned so as to be continuously connected with the outer periphery of the rear-arm sections 42. The peripheral formation plane 55 forms an outer surface of the respective bracket sections 43 other than the engaging surface 53.

Subsequently, the vertical width of the swing arm 30 will be described with reference to FIG. 2. The vertical width of the swing arm 30 becomes the maximum at a center portion in the longitudinal direction where the base section 41 and the rear-arm sections 42 are coupled to each other, and gradually decreases from the center portion toward the front side or the rear side. Specifically, as viewed from the lateral side, the lower edge of the swing arm 30 is formed into a shape which swelled into a circular arc shape at a substantially center portion in the longitudinal direction, and extending from the swelled position in a direction inclined obliquely upwards from both front and rear sides. Further, the upper edge of the swing arm 30 is formed into a shape swelled slightly upwards at a center portion thereof in the longitudinal direction.

Next, the right and left widths of the swing arm 30 and its components including the base section 41, the rear-arm sections 42, and the bracket sections 43 will be described with reference to FIG. 3.

As viewed from the top, the respective rear-arm sections 42 extend rearwards from the rear portion 47*a* of the crossing section 47, and a center region thereof in the longitudinal direction extends so as to swell outwards in the width direction (right and left direction) of the motorcycle, which is opposite to the rear wheel 32. The thickness of the respective rear-arm section 42 in the right and left direction becomes gradually thinner from the front end portion thereof towards the center portion in the longitudinal direction, and maintains a substantially constant thickness from the center portion to the rear end portion thereof. A region S1 extending over the base section 41 from the inner surface of the front side of the respective rear-arm sections 42 in the width direction is formed into a curved shape like a circular arc or a curve similar to the circular arc as viewed from the top. Further, an interval between the right and left rear-arm sections 42 as viewed from the top is formed to be the maximum value at a substantially center position P in the longitudinal direction between the rear portion 47*a* of the crossing section 47 and the engaging surface 55, and gradually decrease from the center position P towards the front side and rear side.

A region S2 extending over the front side of the base section 41 from the outer surface of the front side of the respective rear-arm section 42 in the width direction is formed into a curved shape recessed inwards in the width direction and constricted at the rear side of the front-arm sections 46 as viewed from the top. Accordingly, an outer surface extending from the base section 41 to the respective rear-arm sections 42 in the width direction is formed into gentle S-shape as viewed from the top.

In the bracket sections 43, each surface of the inner side and the outer side of the peripheral formation plan 55 in the with direction is inclined outwards in the width direction from the rear end including a side of the formation region of the hole 52 towards the front side as viewed from the top. That is, as viewed from the top, the peripheral formation plane 55 is formed into a shape extending so as to be inclined in the arrow direction D shown in FIG. 3 along the extension direction of the rear-arm sections 42.

According to the swing arm 30 of the first embodiment, since the peripheral formation plane 55 of the bracket sections 43 is inclined outwards in the width direction towards the front side, the rear-arm sections 42 can be easily designed to have a curved shape swelled outwards as described above.

Further, since the rear-arm sections 42 extends in a direction swelled outwards in the width direction, a dimension of a radius of a circular arc of the region S1 can be increased or the curvature of the curved line can be decreased while securing a clearance between the rear wheel 32 and the respective rear-arm sections 42 at the region S1 of FIG. 3, as compared to the conventional structure in which the inner surface of the arm section is arranged parallel with the longitudinal direction. This ensures that a portion extending from the rear-arm sections 42 towards the crossing section 47 has a cross-sectional shape that changes not sharply, but gently. As a result, the stress concentration on that portion can be suppressed, so that the swing arm has an advantageous feature in terms of durability and strength.

Here, there is a need to reduce the rigidity of the rear-arm sections 42 against a external force in the width direction of the motorcycle in order to absorb a shock from the road when a motorcycle 10 banks along a curve. According to the first embodiment, since it is possible to suppress the stress concentration on the region extending over the rear-arm sections 42 and the crossing section 47, the width of the rear-arm sections 42 in the width direction can be made thinner so as to satisfy the need.

Further, since the region S2 of FIG. 3 is curved and connects with the outer surface of the rear-arm sections 42, the stress concentration on that region is also suppressed, thereby leading to an increase in strength.

In the meantime, the present invention may be modified into a variety of forms without being limited to the illustrated embodiments. In the illustrated embodiments, the sizes or shapes of the components are not limited to the sizes or shapes illustrated in the drawings, but may be adequately changed within the scope that the effect of the invention affects. In addition, it is possible to adequately modify and implement embodiments without departing from the objective scope of the invention.

For instance, the base section 41 can be modified such that it is not provided with the opening 48. Further, the hole 52 is not limited to the long hole, but may include a hole having a cylindrical inner periphery.

Further, the peripheral formation plane 55 may be modified such that only a inner surface thereof in the width direction is formed in the above-mentioned inclined direction, but the outer surface thereof in the width direction is formed in a different direction. However, the first embodiment is advantageous in terms of the suppression of the stress concentration, weight saving, and the like.

The swing arm according to the present invention is applicable to a swing arm which has a pair of rear-arm sections which are positioned such that a rear wheel of a motorcycle is arranged between the rear-arm sections in the with direction of the motorcycle.

[Second Embodiment]

A second embodiment of the present invention will now be described in detail with reference to the accompanying drawings. Although an example of a swing arm to be adapted to an on-road type motorcycle will be described hereinbelow, the adaptive object is not limited thereto, but may change. For example, the swing arm may be adapted to other type motorcycles.

Figure 4:
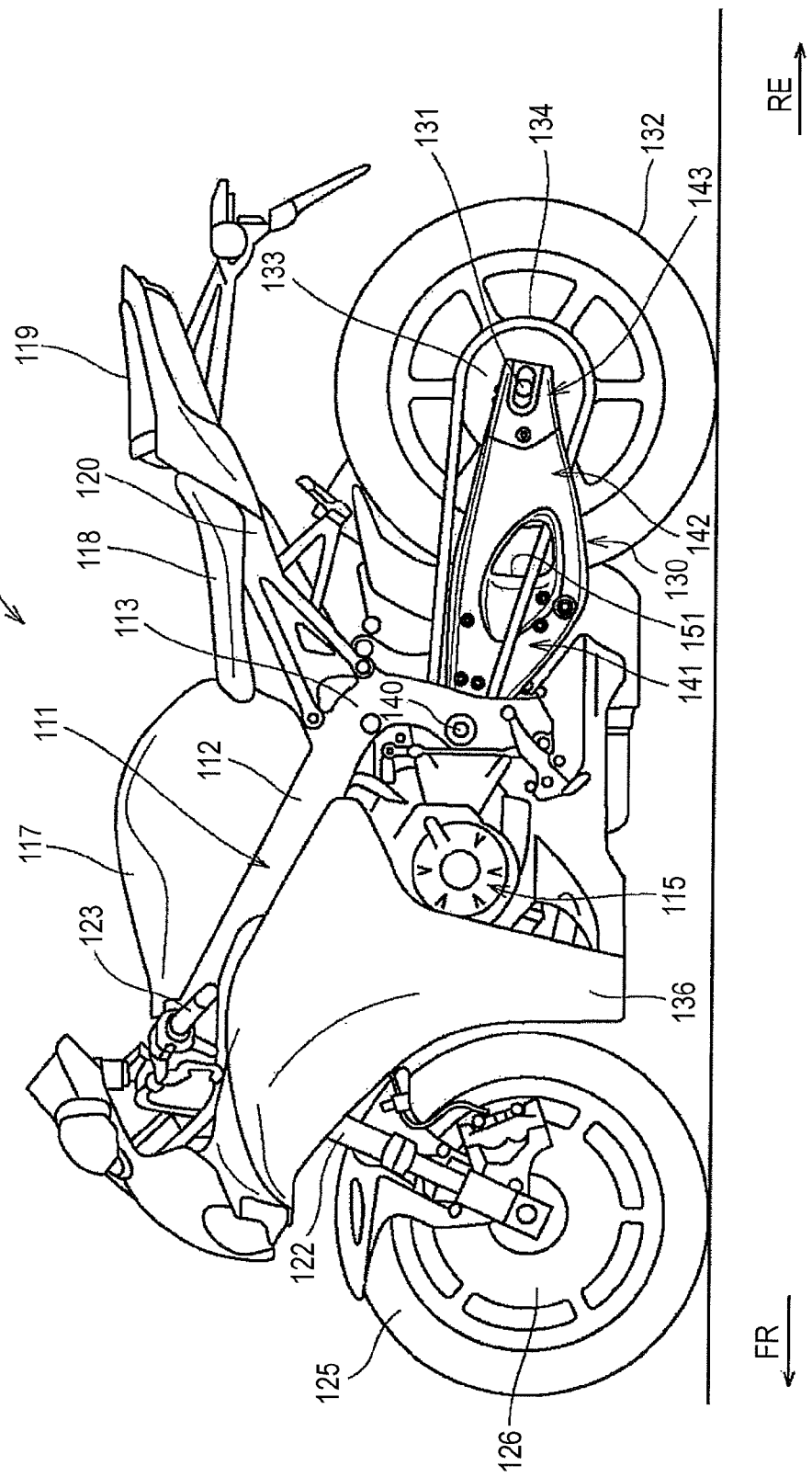
FIG. 4 is a left side view of a motorcycle equipped with a swing arm according to a second embodiment of the present invention.

The schematic construction of a motorcycle equipped with a swing arm according to the second embodiment will now be described with reference to FIG. 4. FIG. 4 is a left side view of the motorcycle according to the second embodiment. In the following description, all directions are based on a viewpoint of a rider on a motorcycle, and as shown throughout the drawings, the forward direction (front side) is indicated by the arrow FR, and the rearward direction (rear side) is indicated by the arrow RE.

The motorcycle 110 is provided with a chassis framework 111 made of steel or aluminum alloy to constitute a body of the motorcycle. The chassis framework 111 has a main frame part 112 which is divided into right and left sections from a head pipe (not shown) positioned at a front end portion thereof, and extends obliquely downward towards the rear side thereof. A swing arm bracket 113 extends downwards from the rear end side of the main frame part 112.

Below the main frame part 112, an engine 115 is suspended from and mounted to an engine suspending bracket (not shown) and the swing arm bracket 113. The engine 115 is comprised of e.g. a parallel 4-cylinder engine and a transmission. A fuel tank 117 is disposed above the main frame part 112. A rider seat 118 and a pillion seat 119 are continuously provided at the rear side of the fuel tank 117. The rider seat 118 and the pillion seat 119 are supported by a pair of right and left seat rails 120 connected to the rear portion of the main frame part 112.

A front fork 122 is rotatably supported by the front end portion of the chassis framework 111 via a steering shaft (not shown). A handle bar (not shown) is provided on an upper end portion of the steering shaft, and grips 123 are respectively provided on both side portions of the handle bar. A front wheel 125 is rotatably supported by the lower portion of the front fork 122. The front wheel 125 is provided with a brake disc 126.

A swing arm 130 is vertically-pivotably connected to the swing arm bracket 113 of the chassis framework 111, and a rear suspension (not shown) is connected between the chassis framework 111 and the swing arm 130. A rear wheel 132 is rotatably supported by the rear portion of the swing arm 130 via an axle 131 extending in the width direction of the motorcycle. A driven sprocket 133 is provided at the left side of the rear wheel 132 and configured to transmit power from the engine 115 to the rear wheel 132 via a drive chain 134. Further, a cowl 136 as an exterior cover of the motorcycle is provided on the periphery of the chassis framework 111 and the like. A gap is formed between the cowl 136 and the chassis framework 111 to introduce external air towards the engine 115 from the front side.

Figure 5:
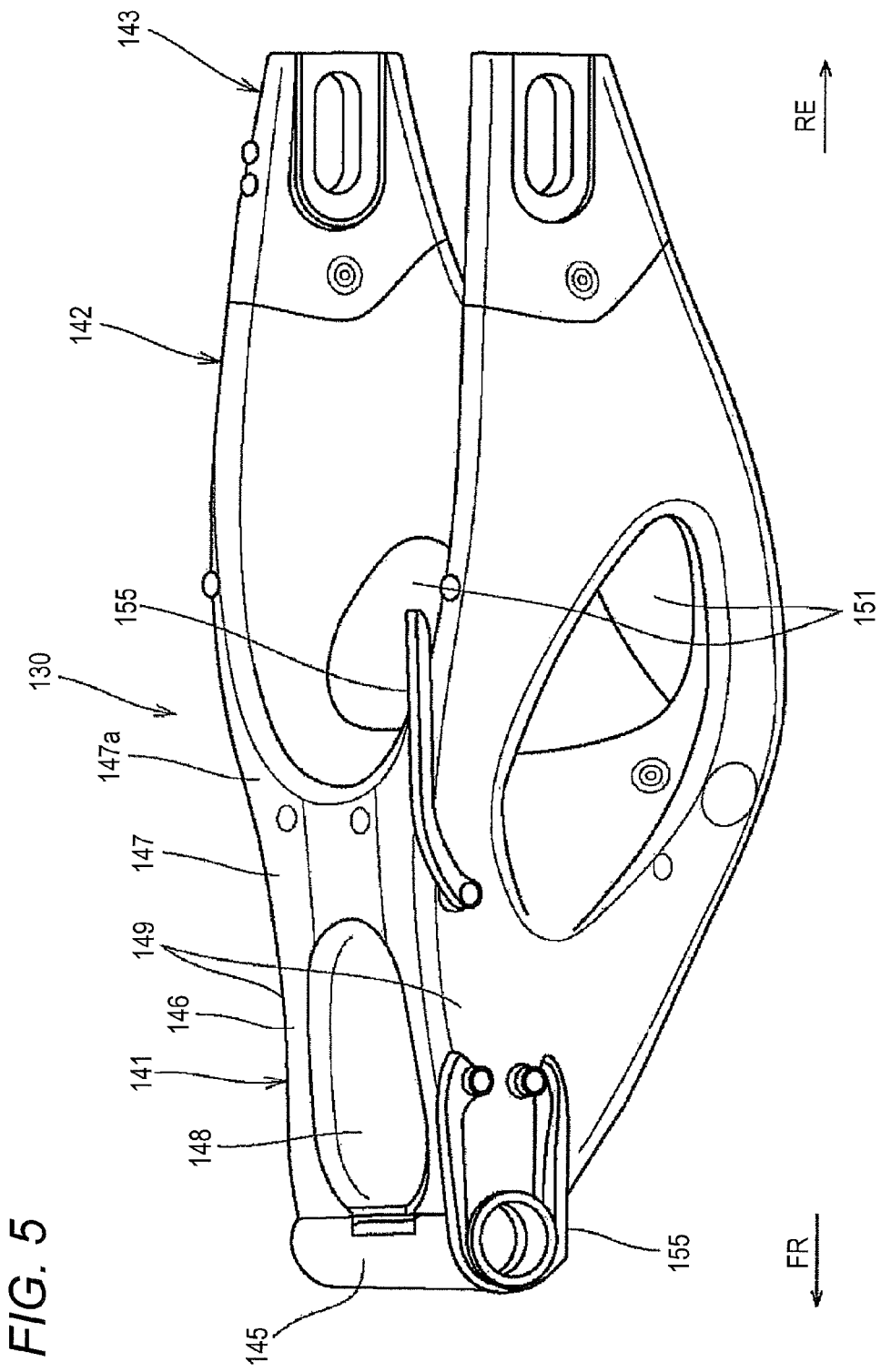
FIG. 5 is a perspective view of the swing arm for the motorcycle according to the second embodiment of the present invention.
Figure 6:
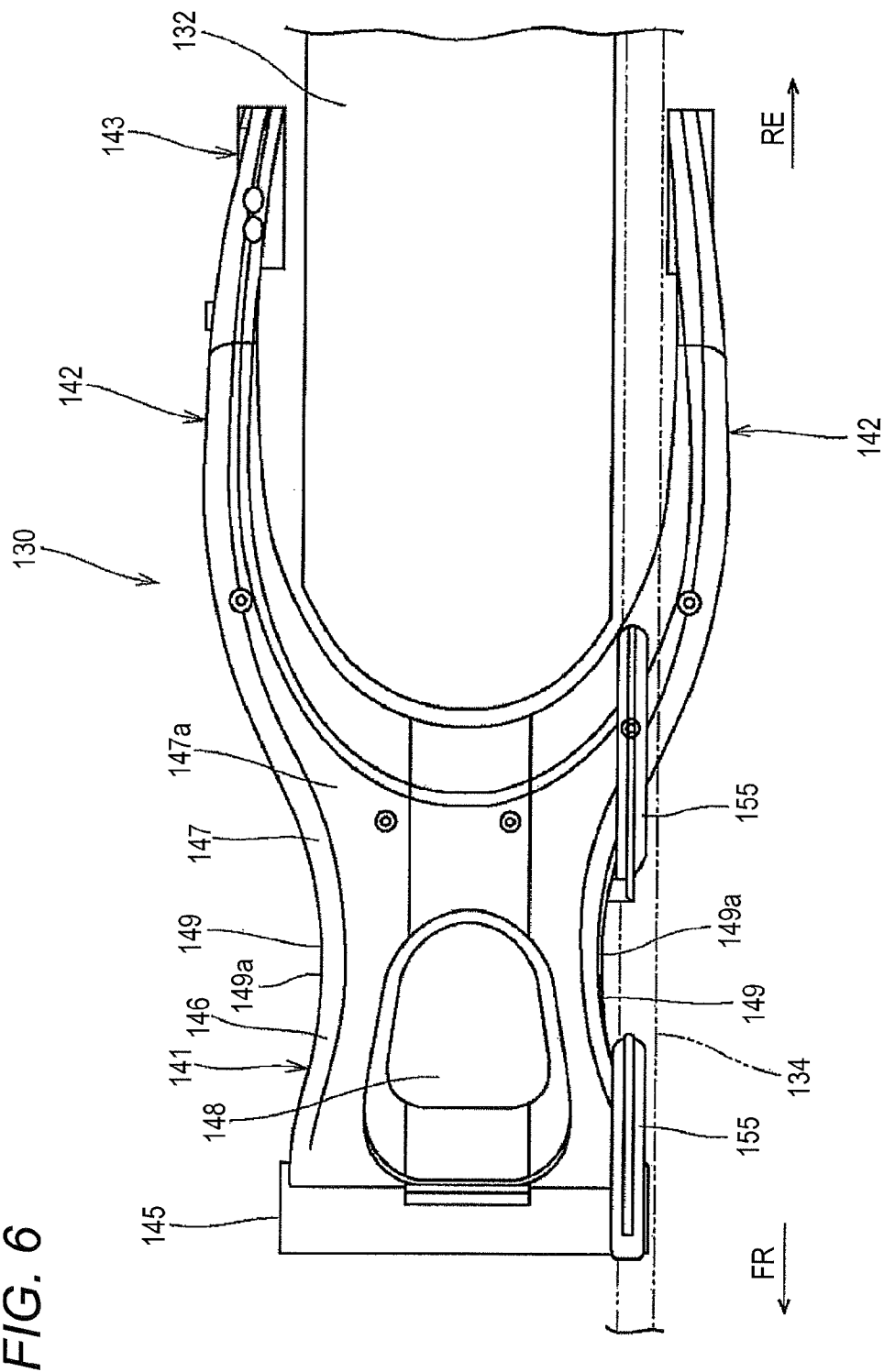
FIG. 6 is a top view of the swing arm according to the second embodiment of the present invention.
Figure 7:
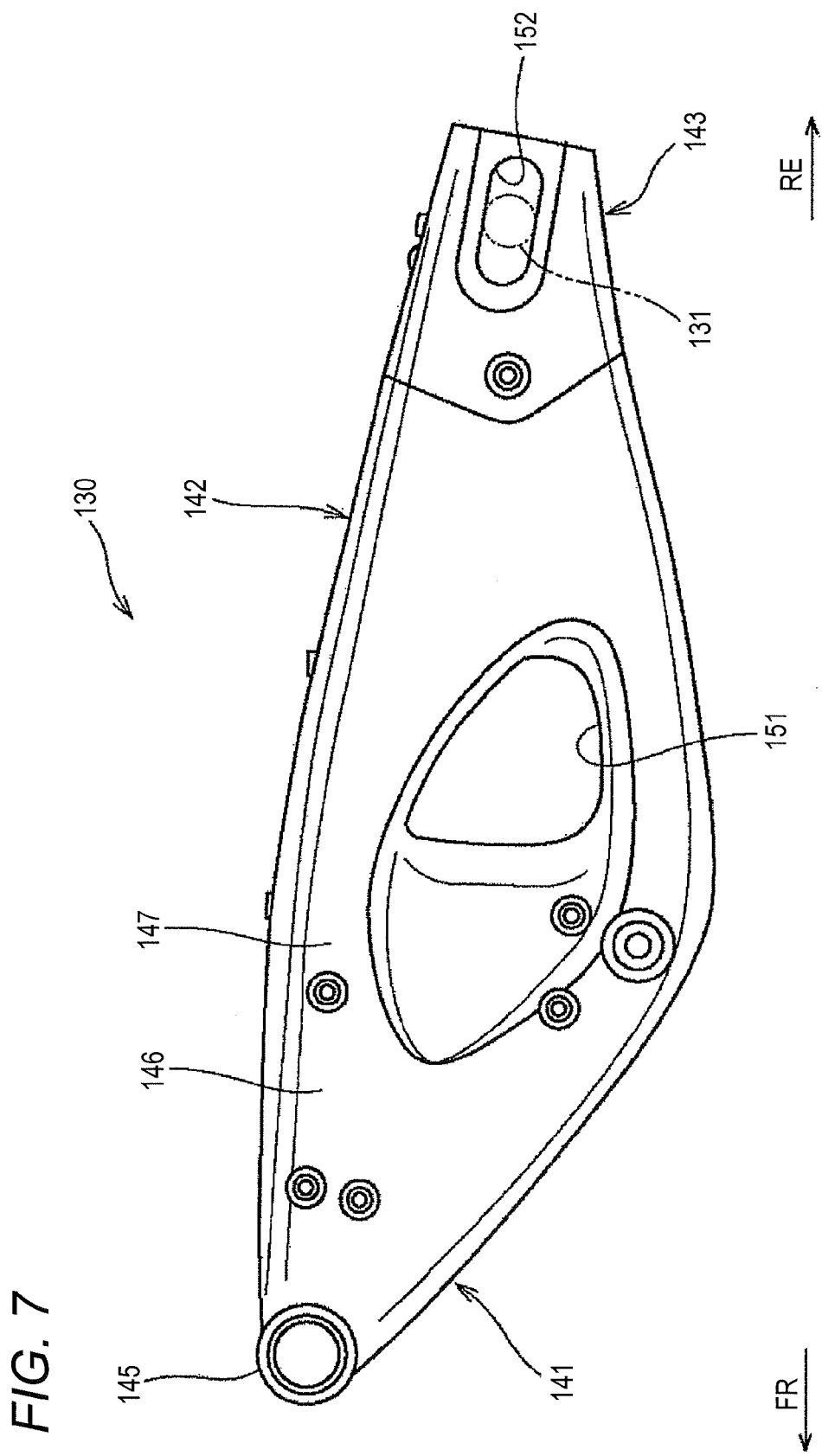
FIG. 7 is a left side view of the swing arm according to the second embodiment of the present invention.

The swing arm 130 will be described with reference to FIGS. 4 to 7. FIG. 5 is a perspective view of the swing arm according to the second embodiment, FIG. 6 is a top view of the swing arm according to the second embodiment, and FIG. 7 is a left side view of the swing arm according to the second embodiment.

The swing arm 130 includes a base section 141 which is connected to the swing arm bracket 113 via a pivot shaft 140, a pair of right and left rear-arm sections 142 which extend rearwards from the base section 141, and a pair of right and left bracket sections 143 which are provided on the rear end portions of the rear-arm sections 142, which are formed into a symmetrical shape with respect to the center line of the motorcycle. In the second embodiment, the base section 141 and the rear-arm sections 142 are formed into a hollow-molded body by press-molding. The bracket sections 143 are integrally formed by forging or casting.

The vertical width of the swing arm 130 becomes the maximum at a substantially center portion in the longitudinal direction where the base section 141 and the rear-arm sections 142 are coupled to each other, and gradually decreases from the center portion towards the front side and the rear side. Further, the lower edge of the swing arm 130 is formed into a shape swelled downwards in a circular arc shape at the center portion in the longitudinal direction, and inclined obliquely upwards from the swelled portion towards the front side and the rear side. Further, the upper edge of the swing arm 130 is formed into a shape swelled slightly upwards at the center portion in the longitudinal direction.

The base section 141 has a cylindrical pivot section 145 which extends in the width direction of the motorcycle, and a pivot shaft 140 penetrates into the pivot section 145. A pair of right and left front-arm sections 146 extend rearwards is formed continuous with the rear side of the pivot section 145, and a single crossing section 147 is formed so as to connect the rear portions of the respective front-arm sections 146 to each other. Accordingly, an opening 148 penetrating in the vertical direction is formed at a portion surrounded by the pivot section 145, the front-arm sections 146, and the crossing section 147, and a rear suspension is disposed within the opening 148.

The respective front-arm section 146 is provided, on the outer surface thereof, with a recessed part 149 curved inwards in the width direction of the motorcycle. A shortest portion in which the length in the width direction is the shortest is formed between most-constricted parts 149a of the respective recessed parts 149, so the respective front-arm sections 146 are formed so as to expand outwards in the width direction toward the front side and the rear side from the shortest portions.

The outer surfaces of the crossing section 147 is formed so as to expand outwards in the width direction toward the rear side, and the pair of right and left front-arm sections 146 are formed so as to be continuous with the pair of right and left rear-arm sections 142 via the crossing section 147.

The respective rear-aim sections 142 extends rearwards from the crossing section 147 so that the rear wheel 132 is disposed between the rear-arm sections 142, and a portion extending from the rear surface of the rear portion 147a of the crossing section 147 over the front portions of inner surfaces of the respective rear-arm sections 142 is formed into a curved shape like a circular arc or curved line similar to the circular arc as viewed from the top.

The respective rear-arm sections 142 extend so as to be swelled most-outward in the width direction at the center region in the longitudinal direction, and the right and left interval in the width direction between the right and left rear-arm sections 142 becomes the maximum value at this center region and gradually decreases from the center region towards the front side and the rear side. Accordingly, an right and left outer surfaces of the swing arm 130 extending from the base section 141 over the respective rear-arm sections 142 are formed into a gentle S-shape as viewed from the top.

The thickness of the respective rear-arm section 142 in the right and left direction gradually decreases from the front end portion towards the center portion in the longitudinal direction, and then has a substantially constant value from the center portion to the rear end portion. Further, a front side region of the respective rear-arm sections 142 are respectively provided with an opening 151 having a substantially triangular shape. As shown in FIG. 6, a drive chain 134 passes through the left opening 151, and the left recessed part 149 is formed at the inner side of the inner surface of the drive chain 134 in the width direction of the motorcycle.

The bracket sections 143 are respectively connected to the rear end portions of the rear-arm sections 142 by welding. The respective bracket section 143 is provided, on the rear end side thereof, with a hole 152 through which an axle 131 passes, so that the rear wheel 132 can be rotatably supported by the bracket sections 143 when the axle 131 is inserted through the hole 152 and a hub (not shown) of the rear wheel 132. The hole 152 is a long hole which is elongated in the longitudinal direction rather than the vertical direction, so that the longitudinal position of the rear wheel 132 can be adjusted by longitudinally moving the axle 131 in the hole 152.

In the swing arm 130 for a motorcycle 110 according to the second embodiment, since the recessed parts 149 are formed on the outer surfaces of the respective front-arm sections 146 and the opening 148 is provided between the right and left front-arm sections 146, the lateral torsional rigidity of the front-arm sections 146 can be reduced. Therefore, the rigidity balance of the front-arm sections 146 and the rear-arm sections 142 is improved, and it is possible to suppress the stress concentration on the connecting portion of the front-arm sections 146 and the crossing section 147 and on the connecting portion of the crossing section 147 and the rear-arm section 142. Further, the structure in proximity to the respective connecting portions is not required to be reinforced, preventing an increase in weight of the motorcycle and reducing the lateral bending rigidity of the entire swing arm 130.

Even in the motorcycle capable of maintaining a deep bank angle upon turning, like the road-type motorcycle 110 according to the second embodiment, by deforming the swing arm, the lateral force applied from the irregular road to the chassis framework can be easily absorbed. This contributes to an improvement in absorbency or stability upon turning, in addition to an improvement in the torsional rigidity improving the straight-motion stability or maneuverability.

Further, since the front-arm sections 146 are provided with recessed parts 149, which are formed at inner side of the inner surface of the drive chain 134, a section along which the drive chain 134 may be brought into contact with the outer surface of the swing arm 130 can be shortened. Accordingly, as shown in FIGS. 5 and 6, a mounting space for a chain buffer 155 can be reduced, thereby leading to saving in weight and cost of the motorcycle.

In the meantime, the above-mentioned description illustrates adequate embodiments for a swing arm for a motorcycle, so it may often include various technical limitations. The technical scope of the present invention, however, is not limited to the illustrated embodiments unless otherwise described herein. That is, the constitutional elements of the former embodiments may be adequately substituted with existing constitutional elements, and may be changed into various variations including combinations with other existing constitutional elements. The inventions described in claims are not defined by the description of the former embodiments.

What is claimed is:

1. A swing arm pivotably connected to a chassis framework of a motorcycle to support a rear wheel, the swing arm comprising:
    a base section connected to the chassis framework via a pivot member;
    a pair of front-arm sections extending rearwards from the base section;
    a crossing section connecting rear portions of the front-arm sections;
    a pair of rear-arm sections extending rearwards from the crossing section so that the rear wheel is disposed between the rear-arm sections in a width direction of the motorcycle; and
    a pair of bracket sections provided at rear end portions of the rear-arm sections, respectively, to rotatably support the rear wheel,
    wherein each of the bracket sections is formed into a shape comprising a hole through which an axle of the rear wheel passes, an engaging plane formed at a region surrounding the hole and extending in a longitudinal direction of the motorcycle, and a peripheral formation plane positioned to connect with the outer periphery of the rear-arm section,
    wherein an inner surface of the peripheral formation plane in the width direction is formed so as to be inclined outwards in the width direction from a rear side towards a front side as viewed from the top,
    wherein the front-arm sections are respectively provided, on outer surfaces thereof, with recessed parts which are curved inwards in the width direction,
    wherein the recessed parts are formed at inner sides of inner surface of a drive chain for transmitting power of an engine to the rear wheel, in the width direction,
    wherein a shortest portion in which a length of the swing arm in the width direction is the shortest is formed between most-constricted parts of the recessed parts and the respective front-arm sections are formed so as to expand outwards in the width direction toward the front side and the rear side from the shortest portion.

2. The swing arm according to claim 1,
    wherein each of the rear-arm sections extends in a direction swelled outwards as viewed from the top,
    wherein an interval between the rear-arm sections as viewed from the top is formed so as to be a maximum value at a substantially center portion between a rear portion of the crossing section and the engaging plane, and
    wherein a region extending over the base section from an outer surface of a front side of each of the rear-arm sections in the width direction is formed into a curved shape as viewed from the top.

3. The swing arm according to claim 2, wherein a region extending over a front side of the base section from the outer surface of the front side of each of the rear-arm sections is formed into a curved shape which is recessed inwards in the width direction as viewed from the top.

4. A swing arm for a motorcycle, comprising:
    a pivot section connected to a chassis framework via a pivot shaft;
    a pair of right and left front-arm sections extending rearwards from the pivot section;
    a crossing section connecting rear portions of the right and left front-arm sections;
    a pair of right and left rear-arm sections extending rearwards from the crossing section so that a rear wheel is disposed therebetween; and
    a pair of bracket sections rotatably supporting the rear wheel at rear end portions of the right and left rear-arm sections,
    wherein an opening penetrating in a vertical direction is formed by the pivot section, the pair of right and left front-arm sections, and the crossing section,
    wherein the pair of right and left front-arm sections are respectively formed, on outer surfaces thereof, with recessed parts which are curved inwards in a width direction of the motorcycle and the recessed parts are continuous to the right and left rear-arm sections through the crossing section,
    wherein a right and left interval in the width direction between the pair of right and left rear-arm sections becomes the maximum value at a center region of the pair of right and left rear-arm sections in a longitudinal direction of the motorcycle and gradually decreases from the center region towards a front side and a rear side,
    wherein the recessed parts are formed at inner sides of inner surface of a drive chain for transmitting power of an engine to the rear wheel, in the width direction,
    wherein a shortest portion in which a length of the swing arm in the width direction is the shortest is formed between most-constricted parts of the recessed parts and the respective front-arm sections are formed so as to expand outwards in the width direction toward the front side and the rear side from the shortest portion.

5. The swing arm according to claim 4, wherein front side regions of the rear-arm sections are formed with holes through which the drive chain is passable.

6. The swing arm according to claim 4, wherein the pivot section, the front-arm sections, the crossing section, and the rear-arm sections are symmetrically arranged with respect to a center line of the motorcycle.

* * * * *